United States Patent Office 2,759,261
Patented Aug. 21, 1956

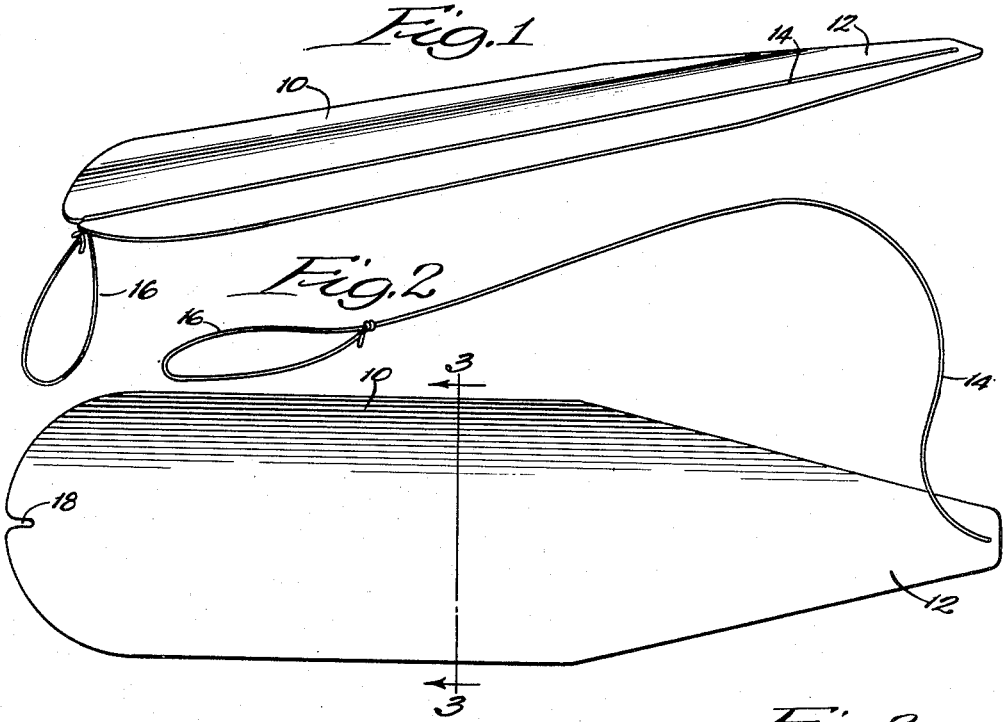

2,759,261

CAKE CUTTER AND SERVER

John C. Setecka, Chicago, Ill.

Application October 30, 1953, Serial No. 389,235

2 Claims. (Cl. 30—116)

This invention relates to a make cutter and more particularly to a cake cutter which can also be used as a server.

As is known when cutting cakes the similar bakery products with a knife or similar edged tool, it is very difficult to perform this operation in such a manner as to preserve the clean looking appearance of the severed portions. This is especially true of cakes covered with a soft icing because the sides of the blade accumulate the icing and prevent clean cuts to be made from the cake. Another difficulty with cake cutting is that is generally requires two separate operations; namely, the initial cutting of the portions of the cake and then detaching the cake from the plate and serving the severed portion. My invention contemplates performing these operations in one efficient operation.

A general object of my invention, therefore, is to provide a utensil for the cutting of cakes and similar bakery products which will also detach the cake from the plate on which it is mounted as well as to perform the function of a server after a portion of the cake has been cut and detached from the plate.

Another object of my invention is to provide a cutter for cakes and similar bakery products which will enable the user to make clean cuts and without mutilating or deforming the portion of the cake being severed.

Still another object of my invention is the provision of a cake cutter incorporating means for detaching the cake from the plate on which it is mounted during the cutting of the cake.

Yet another object of my invention is to provide a utensil for the cutting and detaching of cakes and similar bakery products which will also perform the function of a cake server after the cutting and detaching operation.

Still another object of my invention is to provide a combined cake cutter and server which is inexpensive and simple to make but which is more practical and efficient than presently known cake cutters and/or servers.

The novel characteristics which I believe to be characteristic of my invention are set forth with particularity in the appended claims. My invention itself, however, both as to its construction and mode of operation, together with other features and advantages thereof, may best be understood by reference to the following description taken in conjunction with the preferred form of my invention shown in the accompanying drawings, in which:

Figure 1 is a perspective view showing my new combined cake cutter and server;

Figure 2 is a top plan view thereof;

Fig. 3 is a cross sectional view taken on line 3—3 of Fig. 2;

Figure 4 is a perspective view showing my new combined cake cutter and server being initially used to cut a cake;

Figure 5 is a perspective view showing my new combined cake cutter and server after the initial cut has been made in a cake;

Figure 6 is a perspective view showing my new combined cake cutter and server making additional cuts in the cake; and Figure 7 is a cross-sectional view of my new combined cake cutter and server after it has been inserted under a cake.

Referring to the drawings, the numeral 10 indicates an elongated body member which preferably has a tapered end 12. The body member may be made of any desired material so long as the body member 10 is resilient, the importance of which will be explained hereinafter. I also prefer to have the cross-section of my body member slightly arcuate, as can best be seen in Figure 3.

Secured by any convenient means to the tapered end 12 of the body member 10 is a thread member 14 which is preferably a nylon or similar type thread. The length of the thread is substantially the length of the body member 10 and is provided with a loop 16 to permit easy grasping of the thread 14. Of course, a button or similar article may be used in place of the loop 16. The body member 10 is also provided with a small cut-out portion 18 to conveniently receive and secure the thread 16 when my cake cutter and server is either not in use or when it is in use, as will be explained hereinafter.

Operation

In order to cut a cake or similar bakery product, the body member 10 is grasped and the tapered end 12 is inserted under a cake C which is usually placed upon a base or plate 20. The body member is pushed between the cake C and the plate 20 until the end of the tapered member 12 is substantially central of the cake. As the body member 10 is inserted between the cake and the plate 20, the resiliency of the body member together with the arcuate form of the body member in its cross-section, detaches the cake C from the plate 20 (see Figure 7).

After the tapered end is substantially central of the cake C, the loop 16 is grasped and detached from the cut-out portion 18 of the body member and pulled directly upward, as shown in Figure 5 of the drawings. This forms the initial cut of the cake. Whenever the desired portion of the cake has been determined the thread member 14 is pulled down to the plate 20, leaving the desired cut-out portion of the cake. The body member may then be grasped and used as a cake server in removing the cut-out portion of the cake from the remainder of the body of the cake.

Because a thin threaded member 14 is used, the cuts are clean and do not mutilate the cake. I have found that this is especially true in cakes having a great deal of icing. While I have shown a circular cake, it is, of course, understood that my make cutter and server can be used upon other and different shaped cakes and similar bakery products.

Thus it can be seen that I have shown for the first time a combination cake cutter and server which performs the functions of initially detaching a cake from its plate, cutting a cake and using the cake cutter and server as a means for removing the cut-out portion and serving it. I have found that this utensil provides a cleaner, neater cut portion of a cake or other similar bakery product in a more efficient manner.

While I have shown and described a specific embodiment of my invention, it will, of course, be understood that I do not wish to be limited thereto and that by the appended claims I intend to cover all modifications and alterations falling within the spirit and scope of my invention.

I claim:

1. A combination cake cutter and server comprising, in combination, an elongated server-cutting guide formed from thin stock with a tapered forward portion and a notch at its rearward hand gripping portion, a cake cutting thread member attached at one end to the forward portion of the taper on the server cutting guide, and a stop at the other end of the cutting thread located for insertion in the server-cutting guide notch whereby the cutting thread may be inserted beneath the cake along the axis of the intended cut, said thread member being of sufficient length to extend the length of the server-cutting guide.

2. A combination cake cutter and server comprising, in combination, an elongated server-cutting guide formed from a thin resilient material with a tapered forward serving portion and a rearward hand gripping portion, and a cake cutting thread member attached at one end to the forward portion of the server-cutting guide, the thread member being of sufficient length to extend the length of the server-cutting guide to permit its being raised to cut the cake after being inserted beneath the cake by the server-cutting guide to the center of the cake.

References Cited in the file of this patent

UNITED STATES PATENTS

| | | |
|---|---|---|
| 475,789 | Miller | May 31, 1892 |
| 789,612 | Kelley et al. | May 9, 1905 |
| 2,085,372 | Lenk | June 29, 1937 |